Feb. 22, 1966   L. V. NASLUND   3,236,111
JIG SAW

Filed Jan. 6, 1961   3 Sheets-Sheet 1

INVENTOR.
Lennart V. Naslund,
BY
Cromwell, Greist & Warden
Attys.

Feb. 22, 1966 L. V. NASLUND 3,236,111
JIG SAW
Filed Jan. 6, 1961 3 Sheets-Sheet 2
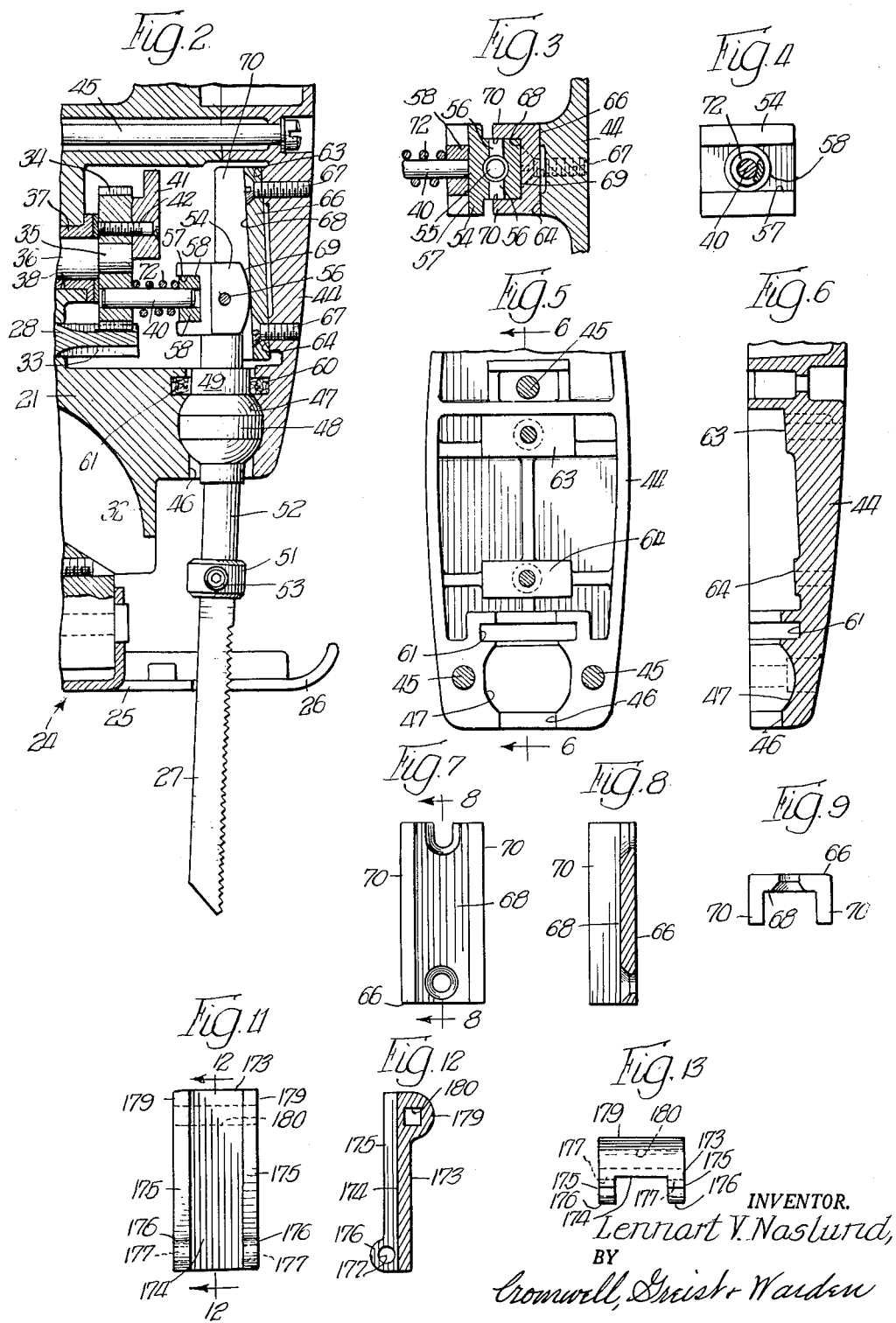
INVENTOR.
Lennart V. Naslund,
BY Cromwell, Greist & Warden

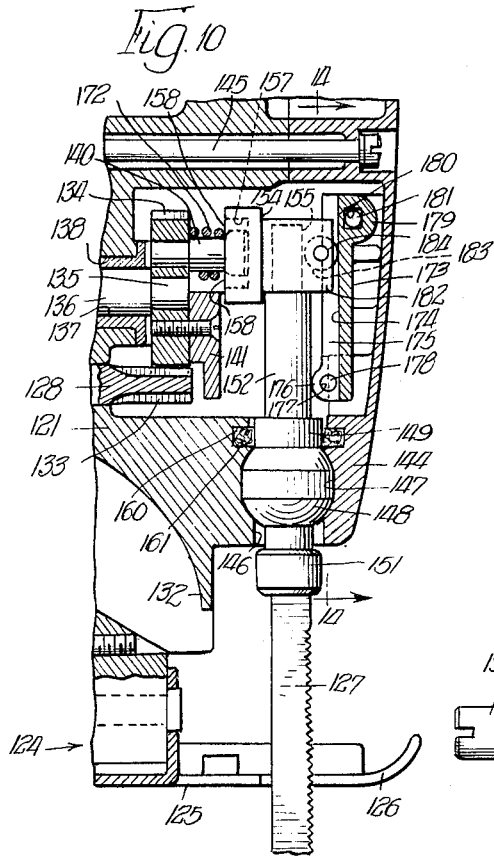

United States Patent Office 3,236,111
Patented Feb. 22, 1966

3,236,111
JIG SAW
Lennart V. Naslund, Chicago, Ill., assignor to Skil Corporation, Chicago, Ill., a corporation of Delaware
Filed Jan. 6, 1961, Ser. No. 81,153
8 Claims. (Cl. 74—50)

The present invention relates to jig saws and, more particularly, to jig saws wherein the saw blade is provided with a rocking or orbital-type motion during reciprocation thereof whereby to provide an improved cutting performance.

An important object of the present invention is to provide a new and improved jig saw wherein the saw blade is rocked rearwardly during its downward stroke for relief purposes and is rocked forwardly during its upward cutting stroke to provide a more effective cutting operation.

Another important object of the present invention is to provide a new and improved jig saw wherein the blade holder is vertically reciprocal through a guide member and wherein the guide member is movably mounted in the jig saw housing in a manner permitting forward and rearward rocking of the blade holder and attached saw blade during reciprocation thereof.

Another important object of the present invention is to provide a new and improved jig saw of the character described wherein a control surface which is inclined downwardly and forwardly is provided immediately forward of the path of movement of the blade holder and wherein means are provided for urging the upper end portion of the blade holder against the control surface during reciprocation thereof whereby to provide the rocking movement of the saw blade.

A still further object of the present invention is to provide a new and improved jig saw of the character described wherein the control surface is readily adjustable between a vertical position and one or more forwardly and downwardly inclined positions whereby the saw blade may be vertically reciprocated either in a vertical plane or with the described rocking motion with the extent of the rocking motion being determined by the adjustment of the control surface.

Further objects of the invention are to provide a new and improved jig saw of the character described which may be simply and economically fabricated, which provides an improved cutting action with the reciprocating movement of the saw blade being adjustable for various materials being cut, and which is rugged and requires little or no maintenance.

Certain other objects of the invention will, in part, be obvious, and will in part appear hereinafter.

For a more complete understanding of the nature and scope of the invention reference may now be had to the accompanying drawings wherein:

FIG. 2 is a vertical section similar to the portion of the jig saw of FIG. 1 which is shown in vertical section with the saw blade in its lowermost position;

FIG. 3 is a fragmentary horizontal section taken generally on the line 3—3 of FIG. 1;

FIG. 4 is a vertical section taken generally on the line 4—4 of FIG. 1;

FIG. 5 is a view looking toward the inner surface of the front plate of the housing taken generally on the line 5—5 of FIG. 1;

FIG. 6 is a vertical section taken generally on the line 6—6 of FIG. 5;

FIG. 7 is an elevational view of the cross-head guide member looking toward the control surface thereof;

FIG. 8 is a vertical section taken generally on the line 8—8 of FIG. 7;

FIG. 9 is a top plan view of the cross-head guide member of FIG. 7;

FIG. 10 is a fragmentary vertical section similar to FIG. 2 of a jig saw embodying another form of the invention;

FIG. 11 is an elevational view in the cross-head guide member of the form of the invention illustrated in FIG. 10 looking toward the control surface thereof;

FIG. 12 is a vertical section taken generally on the line 12—12 of FIG. 11;

FIG. 13 is a top plan view of the cross-head guide member of FIG. 11;

FIG. 14 is an elevational view looking toward the inner surface of the front plate of the jig saw housing of FIG. 10 with the cross-head guide member mounted therein with the view being taken generally on the line 14—14 of FIG. 10;

FIG. 15 is an enlarged side elevational view of the eccentric shaft of FIG. 14;

FIG. 16 is a right end view of the eccentric shaft as shown in FIG. 15;

FIG. 17 is a vertical section taken generally on the line 17—17 of FIG. 14;

FIG. 18 is an enlarged fragmentary view of the upper portion of FIG. 14 showing the eccentric shaft in its innermost position whereby to permit adjustment of the angle of the control surface on the cross-head guide member; and FIG. 19 is a fragmentary vertical section taken generally on the line 19—19 of FIG. 18.

Figure 1:
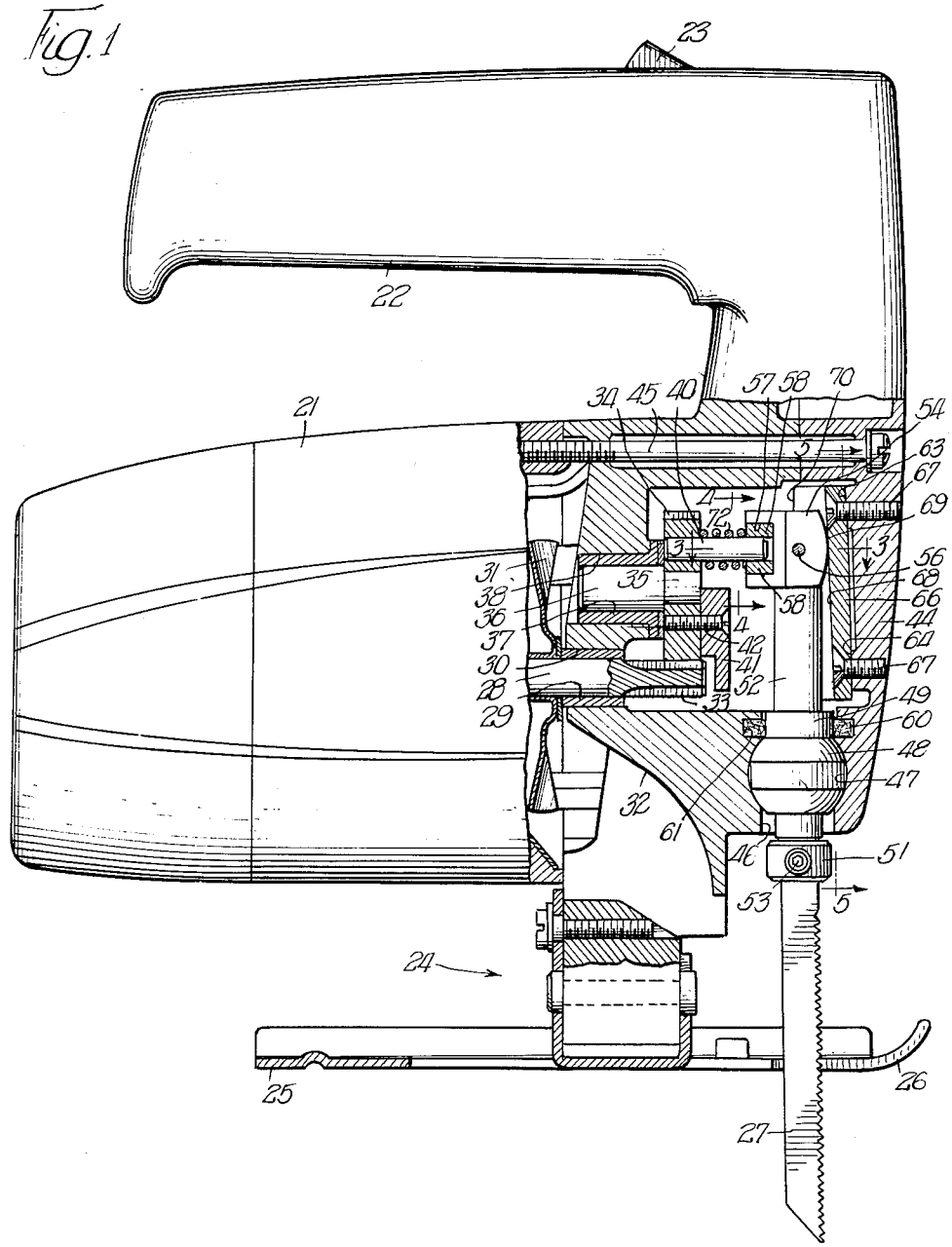
FIG. 1 is a side elevational view, partially in central vertical section, of a jig saw embodying one form of the invention with the saw blade shown in its uppermost position.

As illustrated in FIG. 1, the jig saw includes a housing 21 having a handle 22, including an operating switch 23, secured to the top thereof and a foot assembly 24 depending from the bottom thereof, which foot assembly includes a foot member 25 which is provided at its forward end with a longitudinally extending slot 26 through which a jig saw blade 27 is adapted to be reciprocated in a generally vertical direction. The foot assembly 24 may be provided with a suitable guide member (not shown) for preventing undesirable lateral movement of the saw blade 27. The housing 21 contains an electric motor (not shown) including a drive shaft 28 one portion of which is rotatably mounted in a bearing sleeve 29 mounted in a bore 30 formed in a portion of the housing 21. A fan blade 31 is carried on the drive shaft 28 and is in communication with air intake passages (not shown) and an air outlet passage 32 formed in the housing 21 for cooling the motor in the usual manner. The air outlet passage 32 is directed toward the area where the saw blade 27 engages the material being sawed whereby to aid in chip and saw dust removal.

The forward end of the motor drive shaft 28 is provided with a gear formation 33 which is meshed in driving engagement with a gear 34 which is mounted on a reduced-in-diameter end portion 35 of a stub shaft 36. The stub shaft 36 is rotatably mounted in a bearing sleeve 37 which is mounted in a bore 38 formed in a portion of the housing 21. A drive pin 40 projects forwardly from the front face of the gear 34 and is disposed eccentrically relative to the axis of rotation thereof. A counterweight 41 which is positioned diametrically opposite the drive pin 40 is secured to the front face of the gear 34 by one or more threaded fasteners 42.

The housing 21 includes a removable front plate 44 which is secured to the main portion of the housing 21 by a series of three threaded fastener members 45. The lower portion of the front plate 44 defines with the main portion of the housing 21 a generally vertical passage 46 through the base of the jig saw housing, which passage 46 includes a generally spherical bearing socket portion 47. A generally spherical blade holder guide member 48 is disposed within the generally spherical bearing socket portion 47 and is provided with an upper collar portion 49. An elongated vertically disposed cylindrical blade holder 52 slidably extends through a vertical bore formed in the guide member 48. The lower end of the blade holder 52 is provided with a collar 51 including a set screw 53 for securing the upper end of the saw blade 27 to the blade holder 52. It may be desirable in certain instances to mount the saw blade 27 in the blade holder 52 in a forwardly canted position in a manner well known in the art. A cross head 54, which is secured to an upper reduced-in-diameter end portion 55 (FIG. 3) of the blade holder 52 by conventional means including pins 56, is provided on its rear surface with a horizontally extending slot 57. The forward end of the drive pin 40 is provided with a cylindrical roller bearing 58 which is disposed in driving engagement in the cross head slot 57 whereby during operation of the motor and the resulting rotation of the eccentrically located drive pin 40 on the gear 34, the blade holder 52 and the attached saw blade 27 will be reciprocated in a generally vertical direction in a manner well known in the art.

The diameter of the upper collar 49 of the guide member 48 is less than the corresponding dimension of the upper end of the vertical passage 46 provided in the base of the housing 21 whereby to permit limited rotative movement of the guide member 48 and forward and rearward rocking or pivoting of the blade holder 52 and attached saw blade 27 during reciprocation thereof relative to the guide member 48. A compressible gasket 60 which is fitted about the collar 49 and is seated in an annular groove 61 provides an effective seal at the upper end of the passage 46 while permitting the foregoing rotative movement of the guide member 48 and rocking movement of the blade holder 52 which is reciprocal therethrough.

Provision is made for automatically rocking the blade holder 52 and attached saw blade 27 rearwardly during the down stroke thereof whereby to relieve the blade 27 from the material being cut and for automatically rocking the blade holder 52 and attached saw blade 27 forwardly during the upward cutting stroke whereby to improve the effectiveness of the cutting action of the blade 27. As best illustrated in FIGS. 5 and 6, and the inner surface of the front plate 44 of the housing 21 is provided with vertically spaced bosses 63 and 64 with the faces thereof being disposed in a plane which is inclined forwardly in a downward direction at an angle to the vertical which may be in the order of 3°. A cross head guide member 66, best illustrated in FIGS. 7, 8 and 9, is secured to the bosses 63 and 64 by threaded fasteners 67. The rear surface of the cross head guide member 66 provides a flat control surface 68 which is disposed at the same inclined angle as the plane of the bosses 63 and 64 for engagement by an arcuately curved front surface 69 of the cross head 54. The sides of the cross head guide member 66 are provided with rearwardly projecting flanges 70 between which the forward portion of the cross head 54 is slidably disposed for lateral guiding thereof. The rearward pressure exerted on the saw blade 27 by the material being cut or sawed during normal use of the jig saw serves to retain the cross head 54 against the control surface 68. To retain the front surface 69 of the cross head 54 in contacting engagement with the control surface 68 during non-cutting reciprocation of the blade holder 52 and the attached blade 27, as when the jig saw is idling, a coil spring 72 is disposed about the drive pin 40 and seated between the front face of the gear 34 and the rear of the cross head 54.

With the cross head 54 retained against the control surface 68, which is inclined forwardly in a downward direction, during generally vertical reciprocation of the blade holder 52 and attached blade 27 when the motor is being operated, the saw blade 27 will be rocked or pivoted rearwardly during the downward stroke thereof whereby to relieve the saw blade 27 from the material being cut and will be rocked or pivoted forwardly during the upward cutting stroke whereby to provide a more effective cutting action. This rocking movement of the saw blade 27 may be described as a partial orbital motion.

Another form of the invention, which is embodied in the jig saw illustrated in FIGS. 10–19, is provided with a control surface which is adjustable between a position, which may be vertical, whereby to provide true vertical reciprocation of a saw blade and one or more forwardly inclined positions adapted to provide a rocking or orbital motion of the saw blade similar to that described herein for the form of the invention embodied in the jig saw of FIGS. 1–9. The extent of the rocking motion of the saw blade is determined by the particular angle at which the control surface is set. Thus, the reciprocal motion of the saw blade of the jig saw illustrated in FIGS. 10–19 can be readily adjusted for cutting or sawing different woods and other materials of various hardness. Different types of saw blades may, of course, be used in the jig saw.

As best illustrated in FIG. 10, the adjustable control surface jig saw of FIGS. 10–19, which is similar in structure to the jig saw illustrated in FIGS. 1–9, includes a main housing 121 having a removable front plate 144 (FIG. 14) which is secured to the main housing portion 121 by a series of three threaded fasteners 145. The housing 121 is provided with an air outlet passage 132 and includes a depending foot assembly 124, which assembly includes a foot member 125 having a longitudinally extending slot 126 formed in the forward end thereof through which a saw blade 127 is reciprocal in a generally vertical direction. A motor (not shown) which is mounted in the housing 121 has a drive shaft 128 which is provided on its forward end with a gear formation 133. The drive shaft gear formation 133 is meshed in driving engagement with a gear 134 which is mounted on a reduced-in-diameter front end portion 135 of a stub shaft 136. The stub shaft 136 is mounted in a sleeve bearing 137 which is seated in a bore 138 formed in a portion of the housing 121. The front face of the gear 134 is provided with a forwardly extending drive pin 140 which is positioned eccentrically relative to the axis of rotation thereof and with a diametrically opposite counter weight 141.

The main portion of the housing 121 and the front plate 144 define a vertical passage 146 in the base of the housing 121, which passage 146 includes a generally spherical bearing socket portion 147. A generally spherical blade holder guide member 148 having an upper cylindrical collar 149 is mounted in the bearing socket 147 in a manner permitting forward and rearward pivoting or rocking thereof. A compressible sealing gasket 160 seated in an annular groove 161 fits about the collar 149 whereby to provide a seal in the upper end of the passage 146 while permitting forward and rearward rocking movement of the guide member 148. The guide member 148 is provided with a vertical bore through which an elongated cylindrical blade holder 152 is vertically slidable. The upper end of the saw blade 127 is secured in the lower end of the blade holder 152 by means including a collar 151. If desired, the blade 127 may be forwardly canted relative to the blade holder 152.

A cross head 154 is mounted on a reduced-in-diameter upper end portion 155 of the blade holder 152 and is provided with a rearwardly opening horizontally extending slot 157. The forward end of the drive pin 140, which as shown is somewhat enlarged, is provided with a cylindrical roller bearing 158 which is disposed in driving engagement in the slot 157 in the cross head 155 whereby during operation of the motor and the resulting rotation of the gear 134, the blade holder 152 and attached saw blade 127 will be reciprocated in a generally vertical direction in a manner well known in the art with the guide member 148 permitting forward and rearward rocking of the blade holder 152 and attached saw blade 127 during vertical reciprocation thereof.

Provision is made for adjustably controlling the forward and rearward rocking of the saw blade 127 during generally vertical reciprocation thereof in the form of a pivotally mounted cross head guide member 173 which is best illustrated in FIGS. 11, 12 and 13. The cross head guide member 173 is provided with a rearwardly facing flat smooth control surface 174 which is adapted for contacting engagement by the forward portion of the cross head 154 during reciprocation thereof. The sides of the cross head guide member 173 are provided with rearwardly projecting flanges 175 between which the forward portion of the cross head 154 is laterally guided. The lower ends of the side flanges 175 are curved rearwardly, as at 176, and provided with through bores 177 for receiving a pivot pin 178 which is mounted in the front plate 144 of the housing 121 in a manner to be described. The upper end of the cross head guide member 173 is curved forwardly, as at 179, and is provided with a horizontally extending generally square bore 180 adapted to receive an eccentric shaft 181. As will be described hereinafter, rotation of the eccentric shaft 181 serves to control pivoting movement of the cross head guide member 173 about the pivot pin 178 whereby to adjust the control surface 174 between a vertical position, as in FIG. 10, in which the saw blade 127 will be reciprocal in a vertical plane, and one or more positions in which the control surface 174 is inclined forwardly in a downward direction whereby during reciprocation of the saw blade 127, the saw blade will be rocked or pivoted rearwardly during its downward stroke for relieving the blade 127 from the material being cut and will be pivoted or rocked forwardly during its upward cutting stroke whereby to increase the effectiveness of the cutting action. This rocking movement of the saw blade 127 may be described as a partial orbital motion.

As illustrated in FIG. 10, the cross head 154 is provided with a pair of forwardly projecting spaced apart side flanges 182 which are adapted to be slidably received between the side flanges 175 of the cross head guide member 173 for lateral guiding of the cross head 154. A roller 183 which is mounted between the side flanges 182 of the cross head 154 on a pin 184 projects somewhat forwardly of the forward edges of the side flanges 182 for substantially friction-free rolling engagement with the control surface 174 of the cross head guide member 173. The rearward pressure exerted on the saw blade 127 by the material being cut or sawed during normal use of the jig saw serves to retain the cross head roller 183 against the control surface 174. To resiliently retain the roller 183 in contacting engagement with the control surface 174 of the cross head guide member 173 during non-cutting reciprocation of the blade holder 152 and the attached saw blade 127, as when the jig saw is idling, a coil spring 172 is disposed about the drive pin 140 between the front face of the gear 134 and the rear surface of the cross head 154.

The inner surface of the front plate 144 of the housing 121 is provided with a pair of spaced vertically extending and rearwardly projecting ribs 185 and 186 between which the cross head guide member 173 is pivotally mounted. The lower ends of the ribs 185 and 186 are provided with rearwardly opening recesses 187 for receiving the pivot pin 178. The left side of the plate member 144 (as viewed in FIG. 14) is provided with an inwardly projecting bored boss 188 which is horizontally aligned with the recess 187 formed in the rib 185 and adapted for receiving one end of the pin 178. The other end of the pivot pin 178 is received in an extension of the rearwardly opening recess 187 of the rib 186, which extension is formed in an integral boss 189 (FIG. 17) at the lower end of the rib 186, and retained in the recess extension 187 by clamping means to be described hereinafter.

The eccentric shaft 181 (FIGS. 15 and 16) is provided on one end with a slotted end 190 for engagement by a tool such as a screwdriver and with an enlarged collar 191 having an octagonal outer configuration. Intermediate the opposite end of the shaft 181 and the collar 191, the shaft 181 is provided with a cylindrical eccentric portion 192 having an axis offset eccentrically relative to the axis of rotation of the shaft 181. For mounting the shaft 181 in the front plate 144 of the housing 121 the upper portion of the rib 185 has an outwardly disposed (to the left as viewed in FIGS. 14 and 18) integral enlarged portion 193 provided with a stepped bore 194 adapted to receive and confine the head 190 and the collar 191 of the eccentric shaft 181. The vertically extending portion of the rib 185 is provided with a rearwardly opening recess 195 which serves as an extension of the largest diameter portion of the stepped bore 194 whereby to accommodate rotation of the eccentric portion 192 of the shaft 181. The upper portion of the rib 186 has an outwardly disposed (to the right as viewed in FIGS. 14 and 18) integral boss 196. The rib 186 and the boss 196 are provided with a rearwardly opening stepped recess having an outer portion 197 adapted to receive the end of the shaft 181 and an inner increased-in-diameter portion 198 adapted to accommodate rotation of the eccentric portion 192 of the shaft 181.

An elongated clamping member 199 is provided for retaining the end of the pivot pin 178 in the open recess 187 and for retaining the end of the shaft 181 in the rearwardly opening recessed portion 197. The clamping member 199 is secured intermediate its ends by a threaded fastener 200 to a rearwardly extending boss 201 disposed intermediate the boss 189 and the boss 196. The lower end of the clamping member 199 is curved, as at 202, so that it overlies the end of the pivot pin 178 whereby to retain it in the open recess 187 of the boss 189. The upper end of the clamping member 199 is split whereby to define a pair of fingers 203 and 204. The finger 203 is bent in a manner whereby it overlies the end of the shaft 181 whereby to retain it in the open recessed portion 197 of the boss 196. The finger portion 204 is unbent and it extends directly across the top of the open recessed portion 197 for a purpose to be described hereinafter.

In using the jig saw disclosed in FIGS. 10–19, the control surface 174 is first adjusted to the desired angle for the particular material to be cut or sawed. The setting of the control surface 174 is accomplished manually by rotating the eccentric shaft 181 by means of a screwdriver or other tool engaged in the slotted head 190 thereof. The camming action between the eccentric portion 192 of the shaft 181 and the passage 180 in the upper portion of the cross head guide member 173 (FIG. 19) serves to rotate the cross head guide member 173 about the pivot pin 178 between a position, in which the control surface 174 may be in a vertical plane, as for cutting metal, and one or more positions in which the control surface 174 is inclined forwardly in a downward direction whereby the saw blade 127 will be rocked rearwardly during its downward stroke for purposes of relieving the saw blade from the material being cut and whereby the saw blade 127 will be rocked forwardly during its upward cutting stroke whereby to provide a more effective cutting or sawing action. The extent of this rocking or orbital motion of the saw blade 127 will be determined by the angular setting of the control surface 174. Preferably, different angular settings of the control surface 174 should be utilized for cutting or sawing woods and other materials of varying hardness.

Provision is made for accurately setting the angular inclination of the control surface 174 at several predetermined angles whereby to permit most effective cutting of metals and woods and other materials of various hardness. As best illustrated in FIG. 18, the stepped bore in which the head 190 and collar 191 of the eccentric shaft 181 are received includes the maximum diameter portion 194 which accommodates rotation of the eccentric portion 192 of the shaft 181 and a reduced-in-diameter portion 206 in which the head 190 of the shaft 181 is rotatably and slidably received. Intermediate the portions 194 and 206 of the stepped bore there is provided an intermediate stepped bore portion 207 having an internal octagonal configuration adapted for interlocking engagement with the octagonal collar 191 on the shaft 181. Thus, a number of angular positions of the control surface 174 on the cross head guide or cam member 173 will be determined by the particular rotative position of the collar 191 relative to the octagonal portion 207 of the stepped bore. Suitable indicia (not shown) is provided on the outer surface of the front plate 144 of the housing 121 adjacent the slotted head 190 of the eccentric shaft 181 for indicating the various angular settings of the control surface 174. To permit ready adjustment of the control surface 174 between its various positions, a coil spring 208 is provided about the shaft 181 and is seated between the collar 191 and the adjacent flange 175 of the cross head guide member 173 whereby the spring 208 serves to resiliently urge the collar 191 into interlocked engagement with the internal octagonal portion 207 of the stepped bore.

To manually adjust the setting of the control surface 174, a tool, such as a screwdriver, is merely inserted into the notched head 190 of the shaft 181 and the shaft 181 is pressed inwardly against the action of the spring 208 sufficiently to disengage the collar 191 from the octagonal formation 207 of the stepped bore whereby to permit rotation of the shaft 181 to adjustably pivot the control surface 174 into a different desired angular setting. Upon release of the shaft 181, the spring 208 will urge the collar 191 of the adjusted eccentric shaft 181 into interlocked engagement with the octagonal formation 207 of the stepped bore whereby to lock the control surface 174 at the desired setting. The unbent finger portion 204 of the clamping member 199 is adapted to be engaged by the end of the shaft 181 after it has been moved inwardly a distance sufficient to disengage the collar 191 from the octagonal formation 207 whereby to permit rotatable adjustment of the eccentric shaft 181 while preventing disengagement of the slotted head 190 of the shaft 181 from the stepped bore. In FIG. 18, the eccentric shaft 181 is shown in its innermost position permitting rotatable adjustment thereof with the end of the shaft 181 being shown in abutting engagement with the edge of the flat finger portion 204 of the clamping member 199. In FIG. 14, the eccentric shaft 181 is shown in its outermost position with the collar 191 in interlocked engagement with the octagonal formation portion 207 of the stepped bore and with the end of the shaft 181 shown in spaced relationship from the flat finger portion 204 of the clamping member 199. It is to be understood, of course, that the mating configurations of the collar 191 on the shaft 181 and the portion 207 of the stepped bore may be other than octagonal.

In the invention disclosed herein, it is noted that there is no camming force exerted directly on the saw blades themselves in providing the forward and rearward rocking or orbital motion thereof.

It will be understood that certain changes may be made in the construction or arrangement of the jig saws disclosed herein without departing from the spirit and scope of the invention as defined in the appended claims.

I claim:

1. In a power operated jig saw of the type including a housing containing a motor, an elongated vertically disposed blade holder having a cross-head secured to the upper end thereof and being adapted to have a saw blade secured to and depending from the lower end thereof, and drive means operably connected beween the motor and the cross-head for reciprocating the blade holder and an attached blade in a generally vertical direction during operation of the motor, the improvement which comprises, a generally spherical guide member having a vertical passage through which the portion of said blade holder intermediate its upper and lower ends is reciprocal, said spherical guide member being mounted in a generally spherical bearing socket formed in the lower portion of said housing whereby to permit forward and rearward rocking movement of the guide member about a generally horizontal axis during reciprocation of said blade holder therethrough, a control surface independent of said drive means disposed immediately forward of the path of movement of the cross-head above said guide member and being inclined forwardly in a downward direction, and means associated with the drive means for resiliently retaining the cross-head against said control surface during reciprocation thereof whereby the upper end of said blade holder is pivoted forwardly about the horizontal axis of said guide member during its downward stroke to swing an attached saw blade rearwardly and whereby the upper end of said blade holder is pivoted rearwardly during its upward stroke to swing an attached saw blade forwardly during its upward cutting stroke.

2. In a power operated jig saw of the type including a housing containing a motor, an elongated vertically disposed blade holder having a cross-head secured to the upper end thereof and being adapted to have a saw blade secured to and depending from the lower end thereof, and drive means operably connected between the motor and the cross-head for reciprocating the blade holder and an attached blade in a generally vertical direction during operation of the motor, the improvement which comprises, guide means mounted in the lower portion of said housing and having a vertical passage through which the central portion of said blade holder is reciprocal, said guide means being mounted in said lower portion of said housing in a manner permitting forward and rearward rocking movement thereof about a generally horizontal axis during reciprocation of the blade holder and an attached blade relative thereto, a control surface independent of said drive means disposed immediately forward of the path of movement of the cross-head and above said guide means, said control surface being adjustable between a vertical position and one or more inclined positions wherein said control surface is inclined forwardly in a downward direction, and spring means associated with the drive means for resiliently retaining the cross-head against said control surface during reciprocal movement thereof whereby when said control surface is in one of its inclined positions the upper end of said blade holder is pivoted forwardly about the horizontal axis of said guide means during its downward stroke to swing an attached saw blade rearwardly with the upper end of said blade holder being pivoted rearwardly about said axis during its upward stroke to swing an attached saw blade forwardly during its upward cutting stroke.

3. In a power operated jig saw of the type including a housing containing a motor, an elongated vertically disposed cylindrical blade holder having a cross-head secured to the upper end thereof and being adapted to have a saw blade secured to and depending from the lower end thereof, and drive means operably connected between the motor and the cross-head for reciprocating the blade holder and an attached blade in a generally vertical direction during operation of the motor, which drive means includes a gear and a drive pin projecting eccentrically from the gear into driving engagement with a horizontally extending slot formed in the rear surface of the crosshead, the improvement which comprises, a generally spherical guide member having a vertical bore through which the portion of said blade holder intermediate its upper and lower ends is reciprocal, said spherical guide member being mounted in a generally spherical bearing socket formed in the lower portion of said housing whereby to permit forward and rearward rocking movement thereof about a generally horizontal axis during reciprocation of the blade holder and an attached blade relative thereto, an elongated vertically disposed cam member independent of said drive means disposed in the forward part of the housing above said guide member and having a rearwardly facing flat control surface engageable by the front surface of the cross-head during reciprocal movement thereof, said cam member being pivotally mounted at one end whereby to permit adjustment thereof between a position wherein said control surface is disposed vertically and one or more positions wherein said control surface is inclined forwardly in a downward direction at various angles, manually controllable means for adjusting the position of said cam member, and a spring disposed about the drive pin between the gear and the cross-head for resiliently retaining the cross head against said control surface during reciprocation thereof whereby when said cam member is disposed in one of its inclined positions the saw blade will be swung rearwardly during its downward stroke and forwardly during its upward cutting stroke as a result of forward and rearward pivoting movement of the upper end of said blade holder about the horizontal axis of said guide member during its downward and upward strokes respectively.

4. A power operated jig saw comprising, a housing containing a motor, a guide member mounted in the lower portion of said housing in a manner permitting forward and rearward rocking movement thereof about a generally horizontal axis, an elongated vertically disposed blade holder extending through and slidably mounted in said guide member for generally vertical reciprocal movement relative thereto, said blade holder having a cross-head secured to the upper portion thereof above said guide member and being adapted to have a saw blade mounted in and depending from the lower end thereof beneath said guide member, a drive mechanism operably connected between the motor and said cross-head for normally reciprocating the blade holder and an attached saw blade in a vertical direction during operation of the motor, a control surface independent of said drive mechanism disposed above said guide member and immediately forward of the normally vertical path of movement of said cross-head, means for retaining the forward surface of said cross-head against said control surface during reciprocation thereof, and means for adjusting said control surface between a vertical position and one or more positions wherein said control surface is inclined forwardly in a downward direction at various angles whereby when said control surface is in one of its inclined positions said cross-head during its downward stroke is pivoted forwardly about said horizontal axis of said guide member and during its upward stroke is pivoted rearwardly about said axis whereby the lower end of said blade holder and a saw blade depending therefrom are swung rearwardly during the downward stroke of said blade holder and forwardly during the upward working stroke thereof with the extent of the forward and rearward swinging movement of the saw blade being determined by the angular position of said control surface.

5. A power operated jig saw comprising, a housing containing a motor, a generally spherical guide member mounted in a generally spherical bearing socket formed in the lower portion of said housing in a manner permitting forward and rearward rocking movement thereof about a generally horizontal axis, said guide member having a generally vertical passage extending therethrough, an elongated vertically disposed blade holder slidably mounted in said passage in said guide member for generally vertical reciprocal movement relative thereto, said blade holder having a cross-head secured to the upper end thereof above said guide member and being adapted to have a saw blade mounted in and depending from the lower end thereof beneath said guide member, a drive mechanism operably connected between the motor and said cross-head for normally reciprocating the blade holder and an attached saw blade in a vertical direction during operation of the motor, a control surface independent of said drive mechanism disposed above said guide member and immediately forward of the normally vertical path of movement of said cross-head and being inclined relative to said normally vertical path of movement thereof, and spring means associated with said drive mechanism for resiliently retaining the forward surface of said cross-head against said inclined control surface during reciprocation thereof, whereby said cross-head is pivotable forwardly about the horizontal axis of said guide member during its downward stroke and rearwardly about said axis during its upward stroke to swing the lower end of said blade holder and a saw blade depending therefrom rearwardly during the downward stroke of said blade holder for relief purposes and forwardly during the upward working stroke thereof for improved cutting effectiveness.

6. A power operated jig saw comprising, a housing containing a motor, a generally spherical guide member mounted in a generally spherical bearing socket formed in the lower portion of said housing in a manner permitting forward and rearward rocking movement thereof about a generally horizontal axis, said guide member having a generally vertical passage extending therethrough, an elongated vertically disposed blade holder slidably mounted in said passage in said guide member for generally vertical reciprocal movement relative thereto and for rocking movement therewith, said blade holder having a cross-head secured to the upper end thereof above said guide member and being adapted to have a saw blade mounted in and depending from the lower end thereof beneath said guide member, a drive mechanism operably connected between the motor and said cross-head for normally reciprocating the blade holder and an attached saw blade in a vertical direction during operation of the motor, a control surface independent of said drive mechanism disposed above said guide member and immediately forward of the normally vertical path of movement of said cross-head, spring means associated with said drive mechanism for resiliently retaining the forward surface of said cross-head against said control surface during reciprocation thereof, and means for adjusting said control surface between a vertical position and one or more positions wherein said control surface is inclined forwardly in a downward direction at various angles whereby when said control surface is in one of its inclined positions said cross-head is pivotable forwardly about the horizontal axis of said guide member during its downward stroke and rearwardly about said axis during its upward stroke to swing the lower end of said blade holder and a saw blade depending therefrom rearwardly during the downward stroke of said blade holder and forwardly during the upward working stroke thereof in accordance with the angular position of said control surface.

7. A power operated jig saw comprising, a housing containing a motor, a guide member mounted in the lower portion of said housing in a manner permitting forward and rearward rocking movement thereof about a generally horizontal axis, an elongated vertically disposed blade holder extending through and slidably mounted in said guide member for generally vertical reciprocal movement relative thereto, said blade holder having a cross-head secured to the upper end thereof above said guide member and being adapted to have a saw blade mounted in and depending from the lower end thereof beneath said guide member, a drive mechanism operably connected between the motor and said cross-head for reciprocating the blade holder and an attached saw blade in a generally vertical direction during operation of the motor, a generally vertically disposed plate-like cam member disposed in the forward part of said housing and having a rearwardly facing flat control surface engageable by a front surface of said cross-head, said cam member being pivotably mounted at one end whereby to permit adjustment thereof between a position wherein said control surface is disposed vertically and one or more positions wherein said control surface is inclined forwardly in a downward direction at various angles to the vertical, manually operable means for adjusting the position of said cam member, and means associated with said drive mechanism for resiliently retaining said cross-head against said control surface during reciprocation thereof whereby when said cam member is disposed in one of its inclined positions said cross-head is swung forwardly about the horizontal axis of said guide member during its downward stroke and is swung rearwardly about said axis during its upward stroke whereby the lower end of said blade holder and a saw blade depending therefrom are swung rearwardly during the downward stroke of said blade holder and forwardly during the upward working stroke thereof.

8. A power operated jig saw comprising, a housing containing a motor, a generally spherical guide member having a vertical bore extending therethrough mounted in a generally spherical bearing socket formed in the lower portion of said housing in a manner permitting forward and rearward rocking movement thereof about a generally horizontal axis, an elongated vertically disposed cylindrical blade holder slidably mounted in said bore in said guide member for generally vertical reciprocal movement relative thereto, said blade holder having a cross-head secured to the upper end thereof above said guide member and being adapted to have a saw blade mounted in and depending from the lower end thereof beneath said guide member, a drive mechanism operably connected between the motor and said cross-head for reciprocating the blade holder and an attached saw blade in a generally vertical direction during operation of the motor, said drive mechanism including a gear and a drive pin projecting eccentrically from the front face of said gear into driving engagement with a horizontally extending slot formed in the rear surface of said cross-head, a generally vertically disposed plate-like cam member disposed in the forward part of said housing and having a rearwardly facing flat control surface engageable by a front surface of said cross-head, said cam member being pivotably mounted at one end whereby to permit adjustment thereof between a position wherein said control surface is disposed vertically and one or more positions wherein said control surface is inclined forwardly in a downward direction at various angles to the vertical, manually operable means for adjusting the position of said cam member, and a spring disposed about said drive pin between said gear and said cross-head for resiliently retaining said front surface of said cross-head against said control surface during generally vertical reciprocation thereof whereby when said cam member is disposed in one of its inclined positions said cross-head is swung forwardly about the horizontal axis of said guide member during its downward stroke and is swung rearwardly about said axis during its upward stroke whereby the lower end of said blade holder and a saw blade depending therefrom are swung rearwardly during the downward stroke of said blade holder for relief purposes and are swung forwardly during the upward working stroke thereof to improve the cutting effectiveness of the saw blade.

References Cited by the Examiner

UNITED STATES PATENTS

| 2,704,941 | 3/1955 | Holford | 74—50 |
| 2,737,984 | 3/1956 | Bruck | 143—68.1 X |
| 2,931,402 | 4/1960 | Papworth | 143—68.1 |
| 2,961,016 | 11/1960 | Papworth | 143—68.1 |
| 2,988,924 | 6/1961 | Cooley | 74—50 |

BROUGHTON G. DURHAM, *Primary Examiner.*

MORRIS M. FRITZ, *Examiner.*